(12) United States Patent
Kashihara (10) Patent No.: US 6,339,574 B1
(45) Date of Patent: Jan. 15, 2002

(54) OPTICAL DISK ON WHICH INFORMATION IS RECORDED WITH HIGH DENSITY AND OPTICAL DISK APPARATUS FOR REPRODUCING INFORMATION RECORDED ON THE OPTICAL DISK

(75) Inventor: Yutaka Kashihara, Fuchu (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/389,055

(22) Filed: Sep. 2, 1999

(30) Foreign Application Priority Data

Sep. 22, 1998 (JP) .......................................... 10-268423

(51) Int. Cl.$^7$ ................................................ G11B 7/00
(52) U.S. Cl. ................................................ 369/59.22
(58) Field of Search ........................... 369/47.19, 47.18, 369/53.34, 59.17, 59.19, 59.22

(56) References Cited

U.S. PATENT DOCUMENTS 5,835,466 A * 11/1998 Shimoda ...................... 369/59

OTHER PUBLICATIONS

Miyanabe, et al., "A New Equalizer to Improve a Signal to Noise Ratio", ISOM'98 Technical Digest, pp. 36–37.

* cited by examiner

Primary Examiner—Nabil Hindi
(74) Attorney, Agent, or Firm—Pillsbury Winthrop LLP (57) ABSTRACT

On an optical disk, information is recorded at a track pitch of TP $\mu$m/track and a bit pitch of BP $\mu$m/bit on the basis of a modulation code with a minimum run of D and a code rate of R. By using a light source whose wavelength is $\lambda$ $\mu$m and an objective lens whose numerical aperture is NA, the information is reproduced from the optical disk by a PRML scheme. The optical disk fulfills the following conditions:

$TP > \lambda/(2NA)$ $BP > \{1/(2(D+1)R)\} \cdot \{\lambda/(2NA)\}$ $TP \cdot BP \leq 0.135(\lambda/NA)^2$ $0.361 \leq BP/TP < 1/\{(D+1)R\}$.

15 Claims, 3 Drawing Sheets

OPTICAL DISK ON WHICH INFORMATION IS RECORDED WITH HIGH DENSITY AND OPTICAL DISK APPARATUS FOR REPRODUCING INFORMATION RECORDED ON THE OPTICAL DISK

BACKGROUND OF THE INVENTION

The present invention relates to an optical disk on which information has been recorded with high density and an optical disk apparatus for reproducing the information recorded on the optical disk.

To meet demands that MPEG2 compressed image information should be recorded on one side of a 12-cm-diameter optical disk for more than two hours, DVD systems have been commercialized. In the DVD standard, a disk has a storage capacity of 4.7 GB on one side, a track pitch (the width of each track) of 0.74 $\mu$m/track, and a bit pitch (the length of one data bit on a track) of 0.267 $\mu$m/bit. Hereinafter, DVD complying with the standard is called the current DVD.

The information recorded on an optical disk such as DVD is reproduced using an optical head. In the optical head, an objective lens gathers beams of light emitted from an LD (laser diode) onto a pit pattern on a track on the optical disk. The light beam reflected by the optical disk is gathered by a condenser lens onto a photo detector, which produces a reproduced signal. The reproduced signal from the photo detector is inputted to a reproduced signal processing system. After the signal is waveform-equalized at an equalizer, it is decoded into the data at a signal detector. In the DVD standard, the wavelength of LD in the optical head is 0.65 $\mu$m and the numerical aperture NA of the objective lens is 0.6.

In the current DVD system, a waveform slicing scheme is generally used as a reproduced signal processing scheme. The waveform slicing scheme will be explained by reference to FIG. 1.

Figure 1:
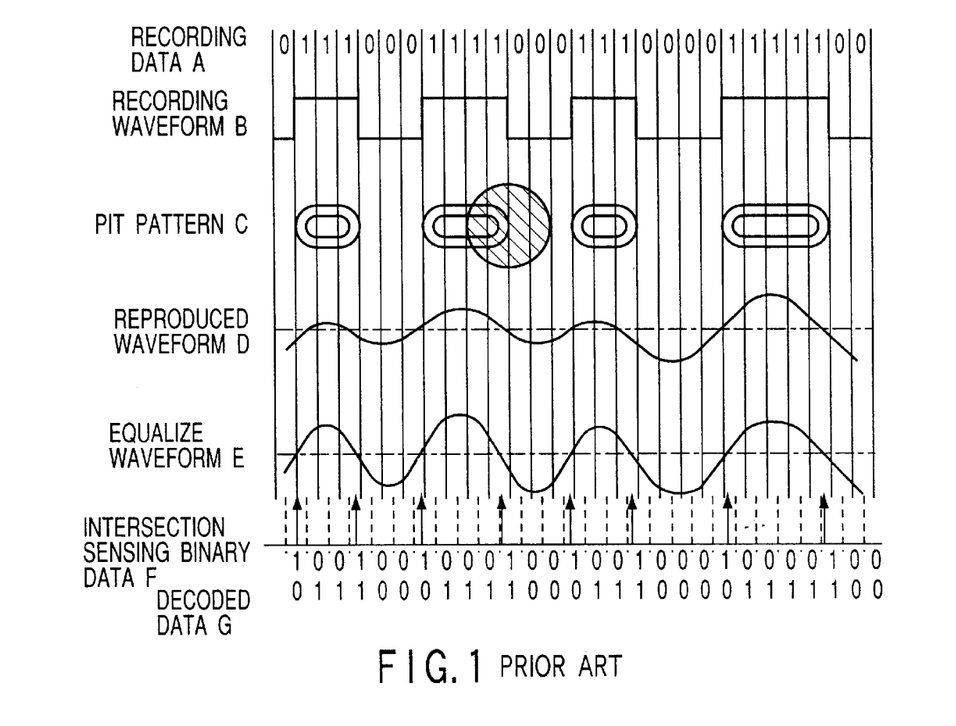
FIG. 1 is a diagram to help explain a waveform slicing scheme.

On an optical disk, a pit pattern C is formed according to the recording waveform B corresponding to recording data A, the information to be recorded.

When the information thus recorded on the optical disk is reproduced, the LD in the optical head projects a light beam for reproduction on the optical disk in the form of a very small beam spot as shown by the shaded portion in the figure, reads the pit pattern, and produces a reproduced signal. The waveform of the reproduced signal (reproduced waveform) is not a rectangular waveform like recording waveform B, but dull reproduced waveform D because of the characteristics of the recording and reproducing system.

Then, the equalizer subjects the reproduced waveform to waveform equalization in such a manner that the intersection of equalized waveform E and a certain set threshold value (shown by a single-dot-dash line) becomes the center of the window. Specifically, the high-frequency components of the reproduced signal are amplified. The signal detector detects the intersection of equalized waveform E and the threshold value and outputs binary data F as follows: if it has detected the intersection within the window, it will output "1," and if not, it will output "0." Then, the binary data F obtained in the intersection detection is subjected to NRZI (Non-Return-to-Zero Inverted) conversion, thereby producing decoded data G.

Optical disks have been required to have much higher density. For example, effort has been directed toward developing a high-definition DVD system capable of recording high-definition images on one side of a 12-cm-diameter disk for more than two hours. The storage capacity required of high-definition DVD is 15 GB/side. Therefore, the high-definition DVD is required to have 3.19 ($\approx$15/4.7) times as high a density as that of the current DVD.

However high the density is made, the signal degrading components increase, as long as the waveform slicing scheme as described above is used as a method of processing the reproduced signal in the system. This makes it impossible to decode the data correctly. Therefore, it is desirable that, instead of the waveform slicing scheme, a PRML (Partial Response and Maximum Likelihood) scheme should be used as a reproduced signal processing scheme to avoid a decrease in SNR.

To make an optical disk have a high density by the PRML scheme, not only is the performance brought out fully, but also conditions under which the information recorded on the optical disk is reproduced correctly have to be found. From these viewpoints, examination must be made as to in what ratio an increase in the recording density to be achieved by the PRML scheme should be allocated to the track pitch and bit pitch. Such an examination has not been made.

BRIEF SUMMARY OF THE INVENTION

Accordingly, it is an object of the present invention to provide an optical disk which, even if the density is made higher than a reduction in the beam spot, enables information to be reproduced correctly, as compared with the current DVD, by allocating an increase in the recording density achieved by the PRML scheme as a reproduced signal processing scheme, to the track pitch and bit pitch suitably, and an optical disk apparatus for reproducing the information from the optical disk.

According to one aspect of the present invention, there is provided an optical disk on which information is recorded at a track pitch of TP $\mu$m/track and a bit pitch of BP $\mu$m/bit on the basis of a modulation code with a minimum run of D and a code rate of R and from which the information is reproduced using a light source emitting a light beam whose wavelength is $\lambda$ $\mu$m and an objective lens whose numerical aperture is NA, the optical disk fulfilling the following conditions:

$TP > \lambda/(2NA)$, $BP > \{1/(2(D+1)R)\} \cdot \{\lambda/(2NA)\}$, $TP \cdot BP \leq (0.168/n) \cdot (\lambda/NA)^2$, and $0.361 \leq BP/TP < 1/\{(D+1)R\}$, where n is a real number greater than 1.

According to another aspect of the present invention, there is provided an optical disk on which information is recorded at a track pitch of TP $\mu$m/track and a bit pitch of BP $\mu$m/bit on the basis of a modulation code with a minimum run of D and a code rate of R and from which the information is reproduced using a light source emitting a light beam whose wavelength is $\lambda$ $\mu$m and an objective lens whose numerical aperture is NA, the optical disk fulfilling the following conditions:

$TP > \lambda/(2NA)$, $BP > \{1/(2(D+1)R)\} \cdot \{\lambda/(2NA)\}$, $TP \cdot BP \leq (0.168/n) \cdot (\lambda/NA)^2$, and $0.361 \leq BP/TP < 0.361n$, where n is a real number greater than 1.

According to still another aspect of the present invention, there is provided an optical disk on which information is recorded at a track pitch of TP μm/track and a bit pitch of BP μm/bit on the basis of a modulation code with a minimum run of D and a code rate of R and from which the information is reproduced using a light source emitting a light beam whose wavelength is λ μm and an objective lens whose numerical aperture is NA, the optical disk fulfilling the following conditions:

$TP>\lambda/(2NA)$, $BP>\{1/(2(D+1)R)\}\cdot\{\lambda/(2NA)\}$, $TP \cdot BP \leq 0.135(\lambda/NA)^2$, and $0.361 \leq BP/TP < 1/\{(D+1)R\}$.

According to still another aspect of the present invention, there is provided an optical disk on which information is recorded at a track pitch of TP μm/track and a bit pitch of BP μm/bit on the basis of a modulation code with a minimum run of D and a code rate of R and from which the information is reproduced using a light source emitting a light beam whose wavelength is λ μm and an objective lens whose numerical aperture is NA, the optical disk fulfilling the following conditions:

$TP>\lambda/(2NA)$, $BP>\{1/(2(D+1)R)\}\cdot\{\lambda/(2NA)\}$, $TP \cdot BP \leq 0.135(\lambda/NA)^2$, and $0.361 \leq BP/TP < 0.451$.

According to still another aspect of the present invention, there is provided an optical disk apparatus comprising: an optical disk on which information is recorded at a track pitch of TP μm/track and a bit pitch of BP μm/bit on the basis of a modulation code with a minimum run of D and a code rate of R; a light source for emitting a light beam whose wavelength is λ μm; an objective lens whose numerical aperture is NA, the objective lens sending the emitted light beam to the optical disk; and a processing unit for processing the information from the optical disk by a PRML (Partial Response and Maximum Likelihood) scheme, wherein the optical disk fulfills the following conditions:

$TP>\lambda/(2NA)$, $BP>\{1/(2(D+1)R)\}\cdot\{\lambda/(2NA)\}$, $TP \cdot BP \leq 0.168/n)\cdot(\lambda/NA)^2$, and $0.361 \leq BP/TP < 1/\{(D+1)R\}$, where n is a real number greater than 1.

According to still another aspect of the present invention, there is provided an optical disk apparatus comprising: an optical disk on which information is recorded at a track pitch of TP μm/track and a bit pitch of BP μm/bit on the basis of a modulation code with a minimum run of D and a code rate of R; a light source for emitting a light beam whose wavelength is λ μm; an objective lens whose numerical aperture is NA, the objective lens sending the emitted light beam to the optical disk; and a processing unit for processing the information from the optical disk by a PRML (Partial Response and Maximum Likelihood) scheme, wherein the optical disk fulfills the following conditions:

$TP>\lambda/(2NA)$, $BP>\{1/(2(D+1)R)\}\cdot\{\lambda/(2NA)\}$, $TP \cdot BP \leq 0.168/n)\cdot(\lambda/NA)^2$, and $0.361 \leq BP/TP < 0.361n$, where n is a real number greater than 1.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which.

DETAILED DESCRIPTION OF THE INVENTION

Hereinafter, referring to the accompanying drawings, an embodiment of the present invention will be explained.

An optical disk apparatus according to an embodiment of the present invention will be explained by reference to FIG. 2.

Figure 2:
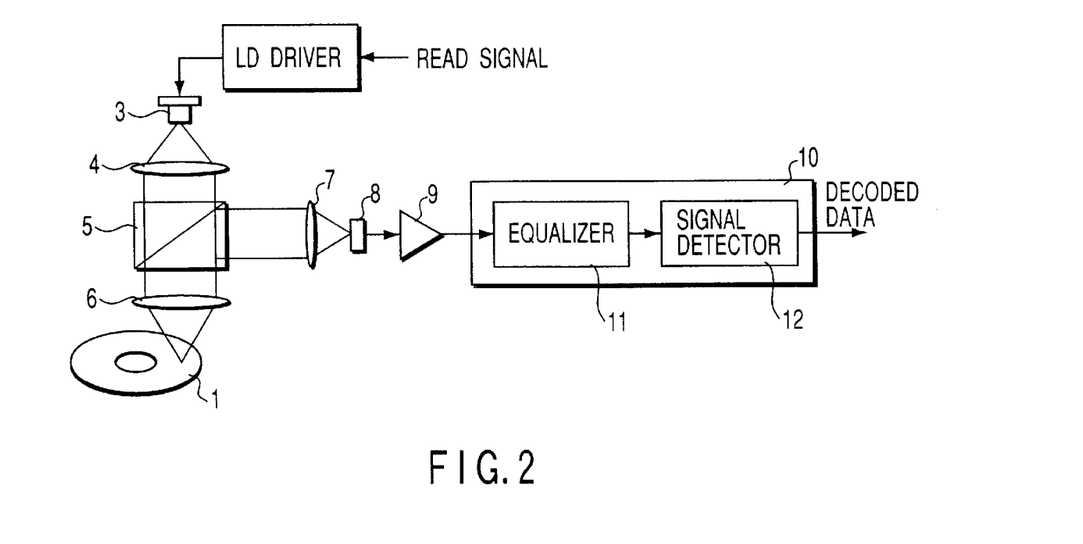
FIG. 2 is a block diagram of an optical disk apparatus according to an embodiment of the present invention.

In FIG. 2, an optical disk 1 is a recording medium on which information has been recorded with high density. On the optical disk 1, information has been recorded at a track pitch of TP μm/track and a bit pitch of BP μm/bit set according to conditions explained later, on the basis of a modulation code ((d, k) code) with a minimum run of D and a code rate of R.

Here, the minimum run D corresponds to the value of d in the (d, k) code and indicates the minimum value of the numbers containing a series of bit information "0" in a data sequence. In the (d, k) code, "k" indicates the maximum value of the numbers containing a series of bit information "0" in the data sequence.

The code rate R corresponds to m/n in which the data sequence to be modulated is divided into blocks in units of m*i bits (referred to as data words) to convert them into code words as n*i symbols.

When the information recorded on the optical disk 1 is reproduced, a READ signal (readout instruction signal) is first inputted to an LD driver 2. Being driven by the LD driver 2, an LD (laser diode) 3 serving as a light source dedicated to reproduction emits beams of light. The light beams emitted from the LD 3 are made parallel by a collimate lens 4 and then are gathered by an objective lens 6 onto a pit pattern (track) on the optical disk 1.

The beam reflected by the optical disk 1 is split by a beam splitter 5 and then gathered by a gathering lens 7 onto a photo detector 8. The photo detector 8 converts the amount of light of the reflected light received into an electric signal and outputs the electric signal as a reproduced signal.

The reproduced signal outputted from the photo detector 8 is amplified by an amplifier 9 and then inputted to a reproduced signal processing system 10. In the reproduced signal processing system 10, the reproduced signal is subjected to waveform equalization at an equalizer 11 according to specific PR equalization characteristics. Then, a signal detector 12 including a Viterbi decoder decodes the data. The reproduced signal processing system 10 employs the PRML scheme as a reproduced signal processing method.

Various physical conditions that should be taken into consideration in making the optical disk 1 have a higher density will be described.

The technique for making an optical disk have a higher density to realize high-definition DVD is to reduce the beam spot. The size of the beam spot is proportional to the wavelength of laser and inversely proportional to the numerical aperture of the objective lens. If the wavelength of the laser used in a high-definition DVD system is $\lambda$ $\mu$m and the numerical aperture of the objective lens is NA, the size of the beam spot in the high-definition DVD system will be given by the following equation, with the size of the beam spot in the current DVD system being 1:

$$\{(\lambda/0.65) \cdot (0.60/NA)\}^2 = 0.852 \cdot (\lambda/NA)^2 \qquad (1)$$

where 0.65 and 0.60 are the laser wavelength and the numerical aperture of the objective lens in the current DVD system, respectively. Specifically, in the high-definition DVD system, an optical system having a blue laser with a wavelength in the range of 0.40–0.43 $\mu$m (e.g., 0.41 $\mu$m) and an objective lens with a numerical aperture of 0.6 is most promising. Substituting these values into $\lambda$ and NA in equation (1) gives $0.852 \cdot (0.41/0.6)^2 = 0.398$.

Specifically, an increase in the high density of the optical disk achieved by the reduction of the beam spot is 2.51 (=1/0.398) times. To achieve the storage capacity of high-definition DVD, not only the reduction of the beam spot but also about 1.25 ($\approx 1.27 = 3.19 \times 0.398$) times as large an increase in the recording density (surface recording density) of an optical disk as that of the present one is needed.

In other words, if the laser wavelength used in the high-definition DVD system is $\lambda$ $\mu$m, the numerical aperture of the objective lens is NA, the track pitch of the high-definition DVD is TP $\mu$m/track, the bit pitch is BP $\mu$m/bit, such TP·BP as meets the following expression has to be found.

$$TP \cdot BP \leq (1/1.25) \cdot 0.74 \cdot 0.267 \cdot 0.852 \cdot (\lambda/NA)^2 = 0.135(\lambda/NA)^2 \qquad (2)$$

In equation (2), 0.74 and 0.267 are the track pitch and bit pitch in the current DVD, respectively. Moreover, $0.852 \cdot (\lambda/NA)^2$ corresponds to equation (1).

Here, consideration will be given to a problem arising from a case where such an optical disk as high-definition DVD with 1.25 times as high a density as that of the current DVD is played back on the same optical system as the current DVD system.

As the track pitch becomes higher, the reproduced signal contains more signal degrading components known as crosstalk components. On the other hand, as the bit pitch becomes higher, the reproduced waveform becomes duller. Since the equalizer amplifies the high-frequency components of the reproduced signal as described above, when the reproduced waveform inputted is duller, the high-frequency components have to be amplified. As a result, the equalizer also amplifies such signal degrading components. When the waveform slicing scheme is used as the reproduced signal processing scheme in the system, the signal degrading components increase, no matter how high the density may be made. This makes it impossible to decode the data correctly.

In an optical system with a wavelength of $\lambda$ $\mu$m and the numerical aperture NA of the objective lens, the amplitude of the reproduced signal appears when the pit repeat period is $\lambda/(2NA)$ $\mu$m or more.

In this case, to effect tracking, the track pitch TP has to meet the following expression:

$$TP > \lambda/(2NA) \qquad (3)$$

For the reproduced signal to appear, the bit pitch BP has to meet the following expression, since the shortest pit length is (D+1)R·BP:

$$BP > \{1/(2(D+1)R)\} \cdot \{\lambda/(2NA)\} \qquad (4)$$

where D is the minimum run of the modulation code used, R is code rate.

When the parameters of the 8/16 modulation code used in recording information in the current DVD system optical system and current DVD are substituted into expression (3) and expression (4), this gives $$\lambda/(2NA) = 0.65/(2 \cdot 0.6) = 0.54$$

$$\{1/(2(D+1)R)\} \cdot \{\lambda/(2NA)\} = \{1/(2(2+1)0.5)\} \cdot \{0.65/(2 \cdot 0.6)\} = 0.18.$$

Since in the current DVD, TP=0.74 and BP=0.267, when an optical disk with 1.25 times as high a density as that of the current DVD is played back on the same optical system as the current DVD system, the SNR (signal-to-noise ratio) of the reproduced signal decreases. However, tracking is not completely impossible, neither does the reproducing disappear completely.

Taking into account a decrease in the SNR of the reproduced signal, it is desirable that instead of the waveform slicing scheme, the PRML scheme should be used as the reproduced signal processing scheme. In the PRML scheme, the equalizer first equalizes the reproduced signal into a waveform having a known correlation between identification points called PR characteristics.

Figure 3:
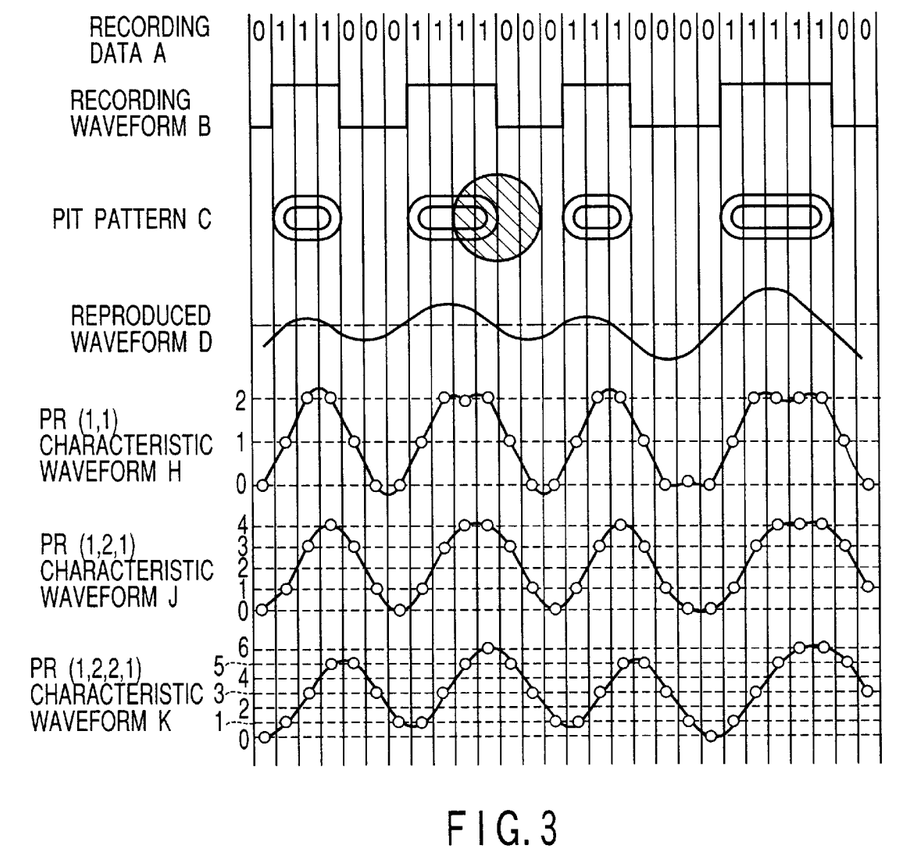
FIG. 3 is a diagram to help explain various PR characteristics used in the PRML scheme.

Here, various PR characteristics will be explained by reference to FIG. 3. In FIG. 3, recording data A, recording waveform B, pit pattern C, and reproduced waveform D are the same as those in FIG. 1. FIG. 3 shows the resulting waveforms H, J, and K after the equalizer equalized reproduced waveform D on the basis of PR (1, 1) characteristic, PR (1, 2, 1) characteristic, and PR (1, 2, 2, 1) characteristic. In PR (1, 1) characteristic, an impulse response appears at two consecutive identification points in a ratio of 1:1. In PR (1, 2, 1) characteristic, an impulse response appears at three consecutive identification points in a ratio of 1:2:1. In PR (1, 2, 2, 1) characteristic, an impulse response appears at four consecutive identification points in a ratio of 1:2:2:1. Although not shown, the same holds true for the other PR characteristics.

From waveforms H, J, and K in FIG. 3, it is found that the waveform after equalization has a duller characteristic in this order: PR (1, 1) characteristic→PR (1, 2, 1) characteristic) PR (1, 2, 2, 1) characteristic. In the PRML scheme, an increase in the signal degrading components at the equalizer can be suppressed by performing waveform equalization using a PR characteristic close to the characteristic of the reproduced waveform.

Figure 4:
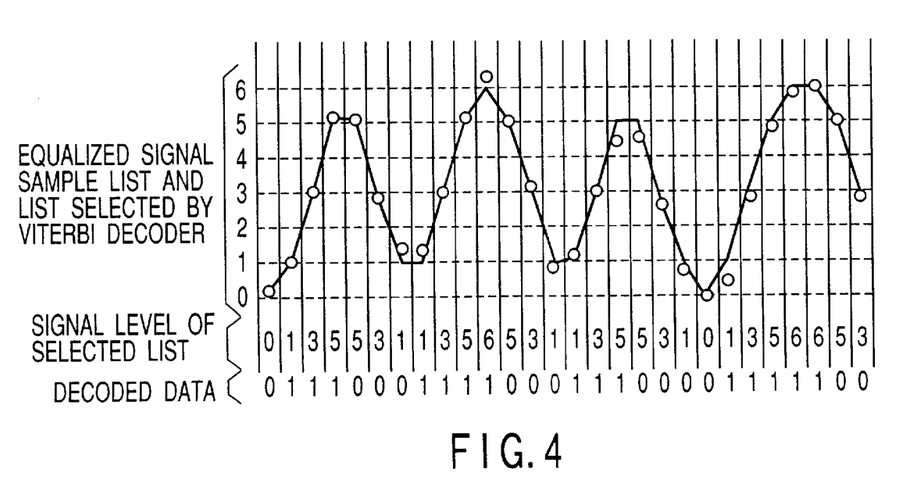
FIG. 4 is a diagram to help explain the operation of a Viterbi decoder.

On the other hand, in the PRML reproduced signal processing system, a Viterbi decoder, a typical most likelihood decoder, is generally used as a signal detector located behind the equalizer. If the equalizer equalizes the reproduced waveform to PR (1, 2, 2, 1) characteristic, the Viterbi decoder selects a list which has the smallest difference from the sample list of the equalized waveform from all the lists fulfilling PR (1, 2, 2, 1) characteristic and outputs the binary data (decoded data) corresponding to the selected list. This is shown in FIG. 4. Since the PRML scheme effects decoding not from a single sample value, but from plural sample values, it has high resistance to signal degrading components having no correlation with each other between sample values.

Next, a preferable configuration of the optical disk 1 will be explained in detail by reference to FIGS. 5 and 6.

pitch are each made the square root of 1.25 times as dense as those in the high-density-oriented reference. Specification 3 is a condition under which the track pitch is made 1.25 times as dense as that in the high-density-oriented reference. As a result, the ratio BP/TP of bit pitch BP to track pitch TP is 0.361 for the high-density-oriented reference, 0.277 for specification 1, 0.361 for specification 2, and 0.451 for specification 3. The reproduced signal processing scheme in the high-density-oriented reference is the same waveform slicing scheme as that in the current DVD. The reproduced signal processing scheme in specifications 1 to 3 is the PRML scheme with a constraint length of 4.

Figure 5:
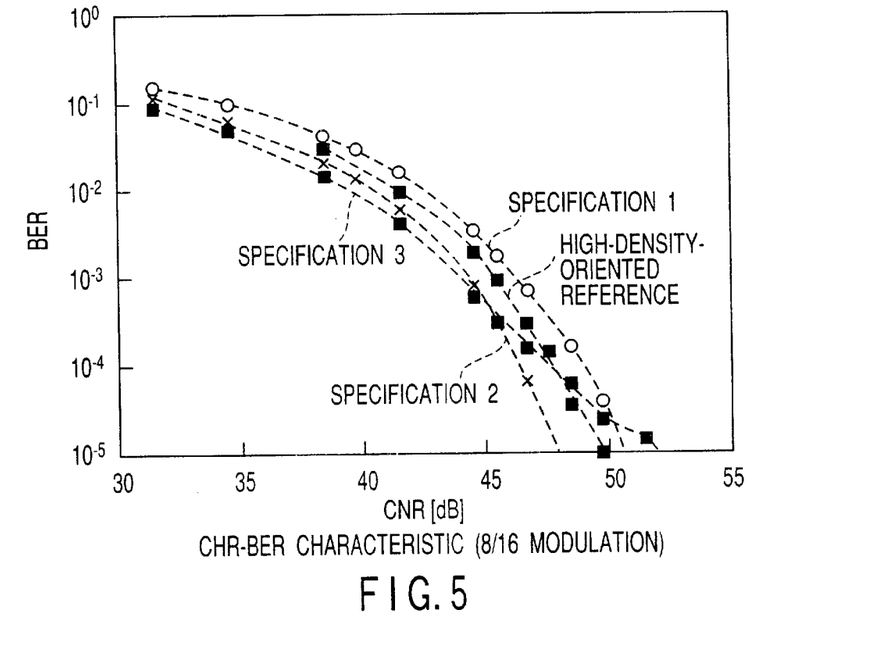
FIG. 5 is a diagram showing a high-density-oriented reference where data is recorded on the basis of an 8/16 modulation code and the CNR-BER characteristics of optical disks in specifications 1 to 3, to help explain conditions for an optical disk of the present invention.

FIG. 5 shows CNR (Carrier Noise Rate)-BER (Bit Error Rate) characteristics when the same 8/16 modulation code as in the current DVD is used as a modulation code. Since the current DVD is required to have a BER of $10^{-4}$ or less, each specification is evaluated with BER=$10^{-4}$. The evaluation has shown that specification 1 provides lower performance than the current DVD and that specifications 2 and 3 provide higher performance than the current DVD. Comparison between specification 2 and specification 3 has shown that specification 2 has better performance.

Figure 6:
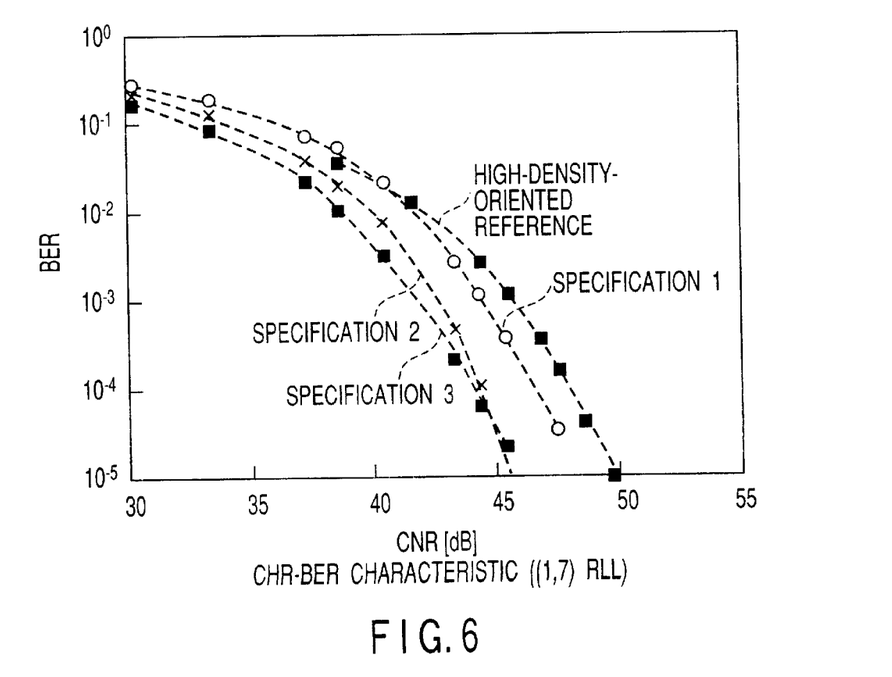
FIG. 6 is a diagram showing a high-density-oriented reference where data is recorded on the basis of an 8/16 modulation code and the CNR-BER characteristics of optical disks in specifications 1 to 3 on which data is recorded using an RLL code (1,7), to help explain conditions for an optical disk of the present invention.

FIG. 6 shows CNR-BER characteristics when the 8/16 modulation code is used as the modulation code for the high-density-oriented reference and the (1, 7) code whose minimum run is 1 (that is, the RLL (Run-Length Limited) code whose maximum run is limited to 7) is used as the modulation code for specifications 1 to 3.

TABLE 1

| | SPEC. 1 | SPEC. 2 | ORIENTED SPEC. 3 | HIGH-DENSITY-REFERENCE |
|---|---|---|---|---|
| STORAGE CAPACITY | 15 GB | 15 GB | 15 GB | 12 GB |
| TRACK PITCH TP ($\mu$m/TRACK) | 0.47 (1.00) | 0.42 ($\sqrt{1.25}$) | 0.38 (1.25) | 0.47 (1.00) |
| BIT PITCH BP ($\mu$m/BIT) | 0.13 (1.25) | 0.15 ($\sqrt{1.25}$) | 0.17 (1.00) | 0.17 (1.00) |
| BP/TP | 0.277 | 0.361 | 0.451 | 0.361 |
| SIGNAL SENSING SCHEME | PRML (CONSTRAINT LENGTH 4) | PRML (CONSTRAINT LENGTH 4) | PRML (CONSTRAINT LENGTH 4) | WAVEFORM SLICE |

VALUE IN PARENTHESES REPRESENTS INCREASE IN HIGH DENSITY IN RATIO

For example, it is assumed that the wavelength (wavelength of the light beam for reproduction) of LD3 is 0.41 $\mu$m and the numerical aperture NA of the objective lens 6 is 0.6. Using such an optical head, an optical disk under the various conditions shown in Table 1 is played back. The high-density-oriented reference in Table 1 means conditions under which each of the track pitch TP and bit pitch BP is made to have 1.58 times (=0.65/0.41) as high a density as those of the current DVD corresponding to a decrease in the wavelength of each laser acting as a light source. At this time, the storage capacity is 12 GB/side. Specifications 1 to 3 provide 1.25 times as high a density as that in the high-density-oriented reference and each assure a storage capacity of 15 GB/side. This is the storage capacity which is required of the aforementioned high-definition DVD.

How 1.25 times are allocated to achieve a higher density differs between specifications 1 to 3. Specification 1 is a condition under which the bit pitch is made 1.25 times as dense as that in the high-density-oriented reference. Specification 2 is a condition under which the track pitch and bit The result has shown that specifications 1 to 3 provide better performance than the high-density-oriented reference. Specification 1, however, has lower performance than specification 2 and specification 3. There is no clear difference between specification 2 and specification 3.

From these things, it is desirable that an increase in the high density achieved by the PRML scheme should be allocated equally to the track pitch TP and bit pitch BP (specification 2) or only to the track pitch TP (specification 3). Specifically, the performance of the PRML scheme is achieved fully by setting the ratio BP/TP of bit pitch BP to track pitch TP at 0.361 or more of specification 2 (0.451 of specification 3) as shown in the following expression:

$$0.361 \leq BP/TP \quad (5)$$

Next, the upper limit of BP/TP will be considered.

To prevent pits from connecting with each other between adjacent tracks on the optical disk, the track pitch TP has to be larger than the width of a pit. Pits are recorded onto the optical disk by using a beam which produces a round spot. From this, the expression (the pit width)≦(the shortest pit length). Since the reproduced signal does not appear sufficiently when the pit width is smaller, high-density optical disks are produced in such a manner that the pit width is substantially equal to the shortest pit length. Specifically, because BP/TP<1/{(D+1)R}, BP/TP has to be set in the range meeting the following expression:

$$0.361 \leq BP/TP < 1/\{(D+1)R\} \qquad (6)$$

It is clear that the upper limit of BP/TP may be 0.451 of specification 3. In that case, BP/TP has to be set in the range meeting the following expression:

$$0.361 \leq BP/TP < 0.451 \qquad (7)$$

Accordingly, in achieving high-definition DVD whose storage capacity is 15 GB/side or larger, the performance of the DVD can be achieved fully and, in spite of the fact that the high density is achieved more than a reduction in the beam spot, the information can be reproduced correctly, as compared with the current DVD, by causing an optical disk on which information is recorded at a track pitch of TP $\mu$m/track and a bit pitch of BP $\mu$m/bit on the basis of a modulation code with a minimum run of D and a code rate of R and from which the information is reproduced by the PRML scheme using an optical system including a light source dedicated to reproduction whose wavelength is $\lambda$ $\mu$m and an objective lens whose numerical aperture is NA, to fulfill the following conditions:

$$TP > \lambda/(2NA)$$

$$BP > \{1/(2(D+1)R)\} \cdot \{\lambda/(2NA)\}$$

$$TP \cdot BP \leq 0.135(\lambda/NA)^2$$

$$0.361 \leq BP/TP < 1/\{(D+1)R\}$$

or the following conditions:

$$TP > \lambda/(2NA)$$

$$BP > \{1/(2(D+1)R)\} \cdot \{\lambda/(2NA)\},$$

$$TP \cdot BP \leq 0.135(\lambda/NA)^2$$

$$0.361 \leq BP/TP < 0.451$$

While in the above embodiment, the case where high-definition DVD with a storage capacity of 15 GB/side has been explained, the present invention is not limited to this. The invention may be applied to any high-definition DVD with a storage capacity greater than 12 GB/side. Therefore, it is not necessary to set an increase in the high density for the high-density-oriented reference (a storage capacity of 12 GB/side) at 1.25 times as shown in Table 1. The increase may be set at n (where, n is a real number greater than 1) times as shown in Table 2.

TABLE 2

|  | SPEC. 1' | SPEC. 2' | SPEC. 3' | HIGH-DENSITY-ORIENTED REFERENCE |
|---|---|---|---|---|
| STORAGE CAPACITY | 12n GB | 12n GB | 12n GB | 12 GB |
| TRACK PITCH TP ($\mu$m/TRACK) | 0.47 (1.00) | 0.47/$\sqrt{n}$ ($\sqrt{n}$) | 0.47/n (n) | 0.47 (1.00) |
| BIT PITCH BP ($\mu$m/BIT) | 0.17/n (n) | 0.17/$\sqrt{n}$ ($\sqrt{n}$) | 0.17 (1.00) | 0.17 (1.00) |
| BP/TP | 0.361/n | 0.361 | 0.361 n | 0.361 |
| SIGNAL SENSING SCHEME | PRML (CONSTRAINT LENGTH 4) | PRML (CONSTRAINT LENGTH 4) | PRML (CONSTRAINT LENGTH 4) | WAVEFORM SLICE |

VALUE IN PARENTHESES REPRESENTS INCREASE IN HIGH DENSITY IN RATIO

Specifically, specification 1' in Table 2 is a condition under which the bit pitch is made n times as dense as that in the high-density-oriented reference. Specification 2' is a condition under which the track pitch and bit pitch are each made the square root of n times as dense as those in the high-density-oriented reference. Specification 3' is a condition under which the track pitch is made n times as dense as that in the high-density-oriented reference. As a result, the ratio BP/TP of bit pitch BP to track pitch TP is 0.361 for the high-density-oriented reference, 0.361/n for specification 1', 0.361 for specification 2', and 0.361n for specification 3'.

In this case, TP-BP in expression (2) have to fulfill the following expression:

$$TP \cdot BP \leq (1/n) \cdot 0.74 \cdot 0.267 \cdot 0.852 \cdot (\lambda/NA)^2 = (0.168/n) \cdot (\lambda/NA)^2 \qquad (8)$$

where n is a real number greater than 1.
The range of BP/TP is set as in expression (6).
As seen from Table 2, the upper limit of BP/TP may be set at 0.361n in specification 3'. Therefore, BP/TP in expression (7) has to be set in the range meeting the following expression:

$$0.361 \leq BP/TP < 0.361n \qquad (9)$$

where n is a real number greater than 1.
Accordingly, in achieving high-definition DVD whose storage capacity is 12 GB/side or larger, the performance of the DVD can be achieved fully and, in spite of the fact that the high density is achieved more than a reduction in the beam spot, the information can be reproduced correctly, as compared with the current DVD, by causing an optical disk on which information is recorded at a track pitch of TP $\mu$m/track and a bit pitch of BP am/bit on the basis of a modulation code with a minimum run of D and a code rate of R and from which the information is reproduced by the PRML scheme using an optical system including a light source dedicated to reproduction whose wavelength is $\lambda$ $\mu$m and an objective lens whose numerical aperture is NA, to fulfill the following conditions:

$$TP > \lambda/(2NA)$$

$$BP > \{1/(2(D+1)R)\} \cdot \{\lambda/(2NA)\},$$

$$TP \cdot BP \leq (0.168/n) \cdot (\lambda/NA)^2$$

$$0.361 \leq BP/TP < 1/\{(D+1)R\}$$

or the following conditions:

$$TP > \lambda/(2NA)$$

$$BP > \{1/(2(D+1)R)\} \cdot \{\lambda/(2NA)\},$$

$$TP \cdot BP \leq (0.168/n) \cdot (\lambda/NA)^2$$

$$0.361 \leq BP/TP < 0.361n$$

where n is a real number greater than 1.

Next, a range of the above $\lambda/NA$ will be described below.

Assume that only the reduction of the beam spot is carried out in implementing the high-definition DVD system, In this case, the size of the beam spot is given by the following equation, in view of the equation (1):

$$0.852 \cdot (\lambda/NA)^2 = 1/3.19 \quad (10)$$

From this equation (10), $\lambda/NA = 0.607$ is obtained.

On the other hand, assume that the same wavelength $\lambda$ and objective lens as in the current DVD are used and the density is made higher by the PRML system in implementing the high-definition DVD system. In this case, the size of the beam spot is given by the following equation:

$$0.852 \cdot (\lambda/NA)^2 = 1 \quad (11)$$

From this equation (11), $\lambda/NA = 1.083$ is obtained.

Therefore, $\lambda/NA$ has to be set in the range meeting the following expression:

$$0.607 < \lambda/NA < 1.083 \quad (12)$$

However, the PRML scheme can provide 1.5 times at best as high a density as that in the current DVD. Accordingly, the density at 1.5 times may be made by the PRML system and a remaining density may be made by the reduction of the beam spot. In this case, the size of the beam spot is given by the following equation:

$$0.852 \cdot (\lambda/NA)^2 = 1.5/3.19 \quad (13)$$

From this equation (13), $\lambda/NA = 0.743$ is obtained.

Consequently, $\lambda/NA$ has to be set in the range meeting the following expression:

$$0.607 < \lambda/NA < 0.743 \quad (14)$$

As described above in detail, with the present invention, when the PRML scheme is used as a reproduced signal processing scheme, it is possible to provide an optical disk capable of, in spite of the fact that the high density is achieved more than a reduction in the beam spot, reproducing information correctly, as compared with the current DVD, by setting the track pitch and bit pitch of a track in a suitable range, and an optical disk apparatus for reproducing information from the optical disk.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk on which information is recorded at a track pitch of TP $\mu$m/track and a bit pitch of BP $\mu$m/bit on the basis of a modulation code with a minimum run of D and a code rate of R and from which the information is reproduced using a light source emitting a light beam whose wavelength is $\lambda$ $\mu$m and an objective lens whose numerical aperture is NA, said optical disk fulfilling the following conditions:

$$TP > \lambda/(2NA),$$

$$BP > \{1/(2(D+1)R)\} \cdot \{\lambda/(2NA)\},$$

$$TP \cdot BP \leq (0.168/n) \cdot (\lambda/NA)^2, \text{ and}$$

$$0.361 \leq BP/TP < 1/\{(D+1)R\},$$

where n is a real number greater than 1.

2. An optical disk on which information is recorded at a track pitch of TP $\mu$m/track and a bit pitch of BP $\mu$m/bit on the basis of a modulation code with a minimum run of D and a code rate of R and from which the information is reproduced using a light source emitting a light beam whose wavelength is $\lambda$ $\mu$m and an objective lens whose numerical aperture is NA, said optical disk fulfilling the following conditions:

$$TP > \lambda/(2NA),$$

$$BP > \{1/(2(D+1)R)\} \cdot \{\lambda/(2NA)\},$$

$$TP \cdot BP \leq (0.168/n) \cdot (\lambda/NA)^2, \text{ and}$$

$$0.361 \leq BP/TP < 0.361n,$$

where n is a real number greater than 1.

3. The optical disk according to claim 1, wherein the information recorded on said optical disk is reproduced by a PRML (Partial Response and Maximum Likelihood) scheme.

4. The optical disk according to claim 1, wherein said modulation code is a run-length code with a minimum run of 1.

5. The optical disk according to claim 1, wherein said optical disk has a storage capacity greater than 12 GB/side.

6. The optical disk according to claim 1, wherein said $\lambda/NA$ fulfills the following condition:

$$0.607 < \lambda/NA < 0.743.$$

7. An optical disk on which information is recorded at a track pitch of TP $\mu$m/track and a bit pitch of BP $\mu$m/bit on the basis of a modulation code with a minimum run of D and a code rate of R and from which the information is reproduced using a light source emitting a light beam whose wavelength is $\lambda$ $\mu$m and an objective lens whose numerical aperture is NA, said optical disk fulfilling the following conditions:

$$TP > \lambda/(2NA),$$

$$BP > \{1/(2(D+1)R)\} \cdot \{\lambda/(2NA)\},$$

$$TP \cdot BP \leq 0.135(\lambda/NA)^2, \text{ and}$$

$$0.361 \leq BP/TP < 1/\{(D+1)R\}.$$

8. The optical disk according to claim 7, wherein the information recorded on said optical disk is reproduced by a PRML (Partial Response and Maximum Likelihood) scheme.

9. The optical disk according to claim 7, wherein said modulation code is a run-length code with a minimum run of 1.

10. The optical disk according to claim 7, wherein said optical disk has a storage capacity greater than 12 GB/side.

11. The optical disk according to claim 7, wherein said $\lambda/NA$ fulfills the following condition:

$$0.607 < \lambda/NA < 0.743.$$

12. An optical disk apparatus comprising:

an optical disk on which information is recorded at a track pitch of TP $\mu$m/track and a bit pitch of BP $\mu$m/bit on the basis of a modulation code with a minimum run of D and a code rate of R;

a light source for emitting a light beam whose wavelength is $\lambda$ $\mu$m;

an objective lens whose numerical aperture is NA, said objective lens sending the emitted light beam to the optical disk; and a processing unit for processing the information from said optical disk by a PRML (Partial Response and Maximum Likelihood) scheme, wherein said optical disk fulfills the following conditions:

$$TP > \lambda/(2NA)$$

$$BP > \{1/(2(D+1)R)\} \cdot \{\lambda/(2NA)\},$$

$$TP \cdot BP \leq (0.168/n) \cdot (\lambda/NA)^2, \text{ and}$$

$$0.361 \leq BP/TP < 1/\{(D+1)R\},$$

where n is a real number greater than 1.

13. The optical disk apparatus according to claim 12, wherein said modulation code is a run-length code with a minimum run of 1.

14. The optical disk apparatus according to claim 12, wherein said optical disk has a storage capacity greater than 12 GB/side.

15. The optical disk apparatus according to claim 12, wherein said $\lambda/NA$ fulfills the following condition:

$$0.607 < \lambda/NA < 0.743.$$

* * * * *